United States Patent
Griffith et al.

(10) Patent No.: US 8,245,127 B2
(45) Date of Patent: Aug. 14, 2012

(54) METHOD AND APPARATUS FOR A DOCUMENT ANNOTATION SERVICE

(75) Inventors: Timothy Peter Griffith, Hampshire (GB); Bernard Zdzislaw Kufluk, Southampton (GB); Sarah Elizabeth Styles, Hampshire (GB); Henry Tonnison, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 12/323,457

(22) Filed: Nov. 25, 2008

(65) Prior Publication Data
US 2009/0150763 A1 Jun. 11, 2009

(30) Foreign Application Priority Data
Dec. 5, 2007 (EP) .................................. 07122429

(51) Int. Cl.
*G06F 17/21* (2006.01)
*G06F 15/16* (2006.01)

(52) U.S. Cl. ........ 715/230; 715/256; 715/261; 715/760; 709/203; 709/219

(58) Field of Classification Search ................. 715/200, 715/201, 202, 203, 204, 209, 226, 227, 229, 715/230, 231, 232, 233, 235, 236, 255, 256, 715/258, 260, 261, 273, 715, 205, 234, 247, 715/713, 731, 752, 760; 709/202, 203, 204, 709/219, 223
See application file for complete search history.

(56) References Cited

U.S. PATENT DOCUMENTS

| | | | | |
|---|---|---|---|---|
| 5,634,084 | A * | 5/1997 | Malsheen et al. | 704/260 |
| 6,385,629 | B1 * | 5/2002 | Sundaresan et al. | 715/235 |
| 6,651,058 | B1 * | 11/2003 | Sundaresan et al. | 1/1 |
| 6,966,030 | B2 * | 11/2005 | Ashford et al. | 715/259 |
| 7,136,876 | B1 * | 11/2006 | Adar et al. | 1/1 |
| 7,177,862 | B2 * | 2/2007 | Zhang et al. | 707/722 |
| 7,236,923 | B1 * | 6/2007 | Gupta | 704/9 |
| 7,599,950 | B2 * | 10/2009 | Walther et al. | 1/1 |
| 7,627,559 | B2 * | 12/2009 | Srivastava et al. | 1/1 |
| 7,761,436 | B2 * | 7/2010 | Norton et al. | 707/705 |
| 7,783,659 | B2 * | 8/2010 | Akkiraju et al. | 707/766 |
| 2002/0156810 | A1 * | 10/2002 | Holland et al. | 707/513 |
| 2003/0120640 | A1 * | 6/2003 | Ohta et al. | 707/3 |
| 2007/0061348 | A1 * | 3/2007 | Holland et al. | 707/100 |
| 2008/0010294 | A1 * | 1/2008 | Norton et al. | 707/10 |

* cited by examiner

*Primary Examiner* — Maikhanh Nguyen
(74) *Attorney, Agent, or Firm* — Steven M. Greenberg, Esq.; Carey, Rodriguez, Greenberg & O'Keefe (57) ABSTRACT

Embodiments of the present invention provide method, system and computer program product for annotating a document being divided by intervals. The method includes identifying, at each interval in the document, one or more keywords in the text of the document; determining, at each interval, the number of context classes associated with each keyword; identifying at least one annotation word and at an interval in the text of the document, the annotation word having two or more annotations associated with two or more context classes; determining the annotation based on the context class with highest count at the annotation word interval; and annotating the document with the determined annotation.

15 Claims, 6 Drawing Sheets

Figure 1

100 method of annotating a document 102 determining, at each interval, the number of keywords 104 determining, at each interval and the number of context classes associated with each keyword 106 determining, for each context class, a context class function 108 approximating a smooth context class function based on the context class count per location in the document 110 identifying at least one annotation word and at an interval in the text of the document 112 determining the annotation based on the context class with highest value at the annotation word interval;

114 annotating the document with the determined annotation.

Figure 2

| Context Class | Keywords (acronyms) |
|---|---|
| Information technology | Computer<br>Hardware<br>Information technology<br>On demand<br>Software<br>technology<br>International Business Machines (IBM) |
| Climate | Burning<br>Climate<br>Earth<br>Fossil fuel<br>Gas<br>Glacier<br>Global warming<br>Scientist<br>Sustainable |
| Magic | Card<br>Illusion<br>Magic<br>Magician<br>Trick<br>International Brotherhood of Magicians (IBM) |

Figure 3

| | Sentence with keyword underlined | IT | Climate | Magic |
|---|---|---|---|---|
| 1 | International Business Machines | 1 | | |
| 2 | Your software purchase is a critical step in making your business an On Demand Business. | 2 | | |
| 3 | With award winning technology at your fingertips, you now face the challenge of integrating powerful solutions into your business as quickly as possible. | 1 | | |
| 4 | IBM Software Services' skilled, knowledgeable consultants can help you successfully implement your solutions, maximize the value of your investment, and address your critical business needs – it's magic. | 2 | | 1 |
| 5 | Climate forecast | | 1 | |
| 6 | Some Scientists predict the Earth will warm by 1.4 – 5.8C by 2100 – others say this is just an illusion. | | 2 | 1 |
| 7 | Most scientists blame – at least in part – increasing amounts of certain gases emitted by fossil fuel burning and other human activities. | | 4 | |
| 8 | The scenarios (right) compare a fossil-fuel driven future with one where sustainable development is a priority. | | 2 | |
| 9 | International Brotherhood of Magicians | | | 2 |
| 10 | The I.B.M. is the world's largest organization for magicians boasting nearly 13,000 members worldwide; with over 300 local groups, called Rings, in more than 73 countries – what a gas. | 1 | 1 | 2 |
| 11 | The I.B.M. is considered to be the most respected technical organization for amateur and professional magicians in the world! | 2 | | 2 |
| 12 | If you have a sincere interest in the art of magic, we invite you to learn more about the I.B.M.! | 1 | | 2 |

Document for Analysis:
*International Business Machines*

*Your software purchase is a critical step in making your business an On Demand Business. With award winning technology at your fingertips, you now face the challenge of integrating powerful solutions into your business as quickly as possible. IBM Software Services' skilled, knowledgeable consultants can help you successfully implement your solutions, maximize the value of your investment, and address your critical business needs.[1]*

Climate forecast

*Scientists predict the Earth will warm by 1.4 - 5.8C by 2100.*

*Most scientists blame - at least in part - increasing amounts of certain gases emitted by fossil fuel burning and other human activities.*

*The scenarios (right) compare a fossil-fuel driven future with one where sustainable development is a priority.[2]*

*International Brotherhood of Magicians*

*The I.B.M. is the world's largest organization for magicians boasting nearly 13,000 members worldwide. With over 300 local groups, called Rings, in more than 73 countries!*

*The I.B.M. is considered to be the most respected organization for amateur and professional magicians in the world! If you have a sincere interest in the art of magic, we invite you to learn more about the I.B.M.![3]*

Figure 6

METHOD AND APPARATUS FOR A DOCUMENT ANNOTATION SERVICE

CROSS-REFERENCE TO RELATED APPLICATIONS

This application claims priority under 35 U.S.C. §119(a) to European Patent Application Serial Number 07122429.9, filed Dec. 5, 2007 entitled "METHOD AND APPARATUS FOR A DOCUMENT ANNOTATION SERVICE", the entirety of which is incorporated herein by reference.

This invention relates to a method and apparatus for a document annotation service. In particular, this invention relates to a method and apparatus for annotating a document based on the context of the document.

BACKGROUND

Modern IT is becoming ever more saturated with acronyms and abbreviations. Learning about a new product or service can easily become over complicated by the sheer volume of acronyms used within the space of even a small document. The current approach with most documents is to either accept the acronym at face value, or spend time researching each acronym separately through an external medium such as an Internet search engine. This can be problematic, as accepting an acronym at face value can detract from the true significance of the acronym. Likewise, externally researching acronyms can be slow and disruptive. Some annotation technologies already exist and are referred to below.

Contextual advertising, originally put forward by Google™, works by allowing advertising context or hyperlinks to be inserted into a webpage. The author enables this feature by adding a JavaScript™ line to the top of the document. The JavaScript analyses the document for keywords and retrieves suitable advert links. The JavaScript then sets separate advertisement spaces or modifies the found keywords into hyperlinks. This gives the idea of augmenting a page for keywords. It is a manual process that requires the author to input the JavaScript on a per page basis. This also implies that the modifications are permanent and cannot be removed. (Google is a trademark of Google Inc. JavaScript is a registered trademark of Sun Microsystems, Inc.)

A "whatis bot" is a Lotus™ Sametime™ automated response script (also known as a bot) that sits over an acronym database. This bot can be queried as in a normal Sametime conversation, and will retrieve the query from its acronym database, returning possible definitions of acronyms in the real time chat window. This proves relatively convenient, but requires the user to break away from the document, to independently query the bot. Lotus and Sametime are registered trademarks of IBM Corporation in the US and other countries.

Extension toolbars in browsers such as Internet Explorer™ and Firefox™ offer toolbar plug-ins which provide extra services, including manipulation of website rendering which could be used for annotation. However the manipulation of the rendering is currently only used for simple parsing; such as adding adverts or blocking pop-ups. More useful and complicated functions such as language translation and page annotation have yet to prove popular. Given the comparative complexity and issues around maintenance and upgrading, it makes more sense to centralize the functionality of the service, rather than building it into every browser. (Internet Explorer is a trademark of Microsoft Corporation. Firefox is a trademark of the Mozilla Foundation.)

There is a need for a resource that can transparently annotate a document using the context of the document as guidance in selecting the annotation.

U.S. Pat. No. 6,651,058 discloses a system and method of automatic discovery of terms in a document that are relevant to a given target topic. This patent publication discloses a method and system for automatic mining of text to discover terms that are relevant to a target term. The system comprises a new terms discoverer, a candidate terms discoverer, and a relevant terms discoverer. The new terms discoverer identifies new terms like books, names, acronyms etc by automatically mining patterns using knowledge rules and identifying relationships using statistical modules. Thereafter, the candidate terms discoverer performs statistical analysis based on the occurrence frequency of the terms within the document to identify potentially relevant terms from the terms identified by the new terms discoverer. The candidate discoverer further includes a database for storing relevant terms in conjunction with the terms identified by the new terms discoverer. Further, the relevant terms discoverer identifies relevant terms by applying the association rules to potentially relevant terms identified by the candidate terms discoverer to refine a relevance of the potentially relevant terms by eliminating false relevant terms. The system utilizes duality concept especially in the case of finding related pairs like acronyms and their expansions arises, by continually iteratively refining pairs of terms that are related.

U.S. Pat. No. 6,966,030 discloses a method, system and computer program product for implementing acronym assistance. The patent publication discloses a method and system for implementing acronym assistance for a user of a text document or browser program. Acronyms in the text document are identified and predetermined number of words around the acronyms is scanned to identify the definition of the acronym. Upon identifying the definition of the acronym, the system automatically displays it to user. Further, if definition is not found in the proximity of the acronym in the document, the system refers to an acronym dictionary to identify definition of the acronym. User selected options are provided for displaying the definition of the acronym to the user. The definition of the acronym can be provided in-line in the document text or presented as a footnote definition with a reference to an original acronym definition.

Whilst both these patent publications are relevant to annotating acronyms in a single document context they do not address the issue of acronyms with multiple meanings or of different contexts within a document. Nor do they address the issue of different context for a single acronym.

SUMMARY OF INVENTION

According to a one aspect of the preferred embodiment there is provided a method of annotating a document, said document being divided by intervals, said method comprising: identifying, at each interval in the document, one or more keywords in the text of the document; determining, at each interval, the number of context classes associated with each keyword; identifying at least one annotation word and at an interval in the text of the document, said annotation word having two or more annotations associated with two or more context classes; determining the annotation based on the context class with highest count at the annotation word interval; and annotating the document with the determined annotation.

This solution provides two different hypertext pop-ups over two occurrences of the same acronym in two different document contexts. The pop-up can contain a link to a more detailed definition that could be followed should the user require more clarification.

The solution provided by the preferred embodiment of the invention is an external HTTP proxy server acting as an annotation server. By using a series of 'micro plug-ins' for the popular browsers the service can be simply presented as an on/off switch. When enabled, the browser redirects the HTTP requests through the annotation server which, in turn, forwards the request to the website host. On receipt of the response, the annotation server fragments the document and identifies acronyms against a store. As acronyms frequently have multiple interpretations, the identifier needs classification based on the context in which the acronym is based. In such a case of conflict, a scoring algorithm is used between the candidates.

Once the acronyms have been located and classified, the document is reconstituted with spanning tags surrounding each identified acronym. An embedded style sheet is then pre-pended to the top of the document. The style sheet contains a JavaScript method for the tool tips, as well as the text information to be displayed for each of the located acronyms. The modified document is then sent back to the user in response to their original request.

Preferably only a subset of the most frequently occurring context classes are counted at each interval.

Advantageously the method further comprises: determining, for each context class, a context class function based on the context class count at each interval in the document; approximating a smooth context class function based on the context class count per location in the document; and determining an annotation based on the context class function with the highest value at the annotation word interval.

More preferably the context class determining step uses a hierarchical context class dictionary comprising context classes and context sub-classes and identifying the most frequently occurring context class by taking into consideration the context class and context sub-class.

According to a second aspect of the preferred embodiment there is provided a system of annotating a document, said document being divided by intervals, said system comprising: a keyword identifier for identifying, at each interval in the document, one or more keywords in the text of the document; a context class determiner for determining, at each interval, the number of context classes associated with each keyword; an annotation word identifier for identifying at least one annotation word and at an interval in the text of the document, said annotation word having two or more annotations associated with two or more context classes; an annotation determiner for determining the annotation based on the context class with highest count at the annotation word interval; and an annotation mechanism for annotating the document with the determined annotation.

According to a third aspect of the preferred embodiment there is provided a computer program product comprising computer readable recording medium having computer readable code stored thereon for annotating a document, said computer readable code which when loaded onto a computer system and executed performs the following steps: identifying, at each interval in the document, one or more keywords in the text of the document; determining, at each interval, the number of context classes associated with each keyword; identifying at least one annotation word and at an interval in the text of the document, said annotation word having two or more annotations associated with two or more context classes; determining the annotation based on the context class with highest count at the annotation word interval; and annotating the document with the determined annotation.

DESCRIPTION OF DRAWINGS

Embodiments of the invention will now be described, by means of example only, with reference to the accompanying drawings in which.

DESCRIPTION OF THE EMBODIMENTS

Figure 1:
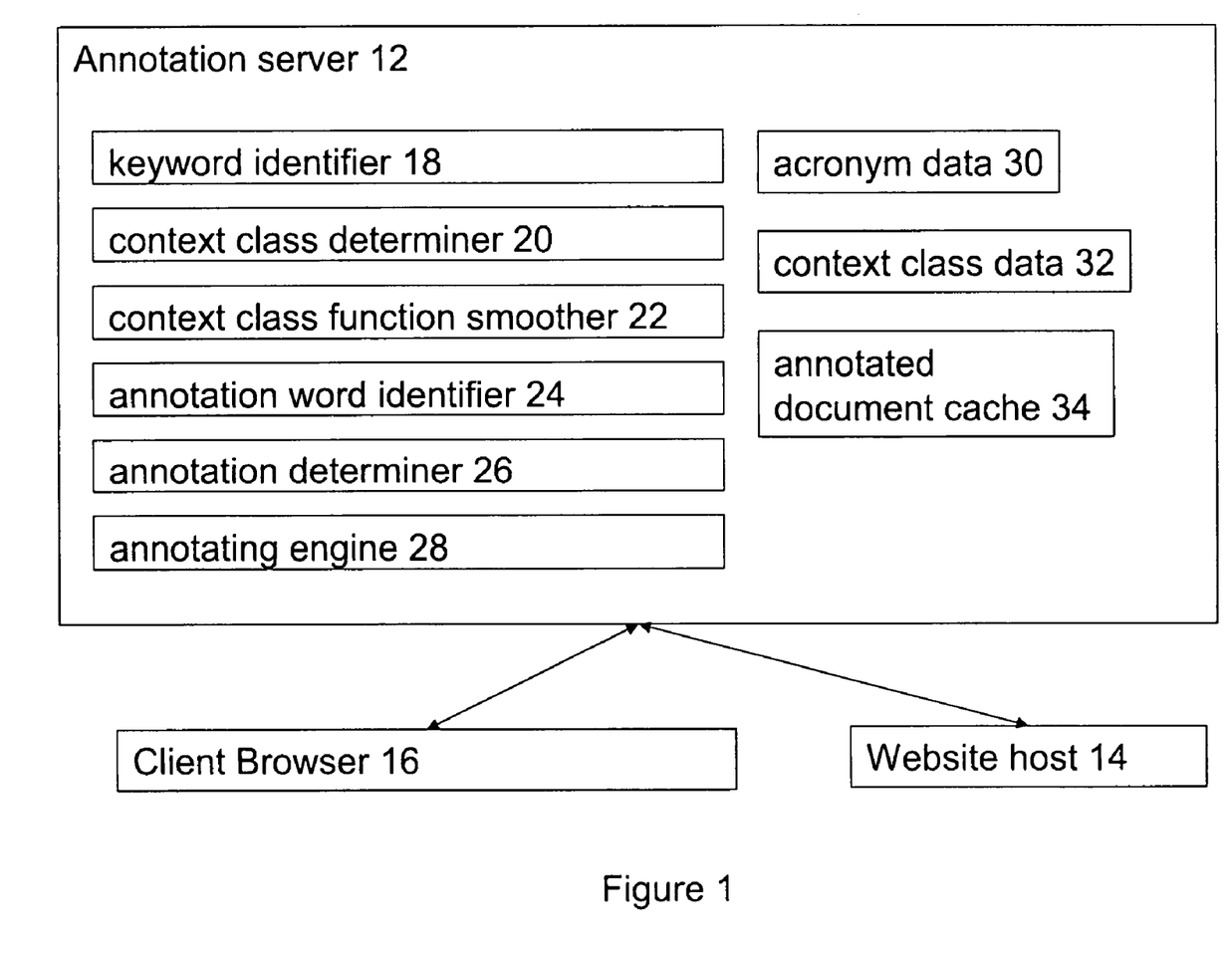
FIG. 1 is a schematic view of the components of an annotation server according to the preferred embodiment.

Referring to FIG. 1, the preferred embodiment of the invention is an acronym annotation system using an HTTP proxy server. The acronym annotation system comprises an annotation server 12 acting as an HTTP proxy for the website host 14 and an internet browser client 16. Web page retrieval is normally only between the client 16 and the website 14 whereas in the preferred embodiment the client 14 requests a document from the website 16 via the annotation server 14 acting as a proxy for the website.

The annotation server comprising: a keyword identifier 18; a context class determiner 20; a context class function smoother 22; an annotation word identifier 24; an annotation determiner 26; an annotating engine 28; acronym data 30; context class data 32; and an annotated document cache 34.

The keyword identifier 18 is for identifying, at each interval (e.g. sentence) in the document, one or more keywords in the text of the document.

The context class determiner 20 is for determining, at each interval (e.g. sentence) in a document, the number of Context Classes associated with each keyword. In the preferred embodiment only a subset of the most frequently occurring Context Classes are counted at each interval. The context class determiner 20 uses a hierarchical context class data 32 comprising context classes, contexts sub-classes and keywords to identify the most frequently occurring Context Class. A document is analysed to determine keywords. In the preferred embodiment this is achieved in two stages. The first stage builds up a list of context classes that are in the document as a whole, and the second pass looks at each sentence for each context class and then performs smoothing on the data. In this way the Context Classes of sentences will be smoothed with respect to the context of the document. No one sentence will have a Context Class out of context with the Context Classes of document. In practice this tends to mean that top Context Classes of a sentence are taken from the top Context Classes of the document. However, the smoothing is an improvement of the main idea if the assumption is that context is more likely to be a smooth function.

A Context Class describes a field or 'area of expertise' and has one or more associated sub-Classes and one or more associated Keywords or a series of Keywords. A Context-sub-Class may be a sub-class of more than one Context Class. A Context sub-Class can have one or more associated Context sub-Classes and one or more associated Keywords or a series of Keywords. A Context sub-Class could be 'Computer Programming', whose Parent Context Class could be 'Information Technology' and 'Discrete Mathematics' and whose Unique Words would include 'programming', 'design patterns', 'compiler', etc. By allowing Context Classes to contain other Context sub-Classes within their definition, the initial Context Class will resemble a tree structure. This will help further define where the Context Class lies within the overall ontology of classification. Each supporting component, be it context or keyword, has a value of applicability. This value is simply an indicator of the strength of the association between the supporting component and the context itself, these values become intrinsically valuable later on.

The context class function smoother 22 is for determining, for each context class, a context class function based on the context class count at each interval in the document; and approximating a smooth context class function based on the context class count per location in the document.

The annotation word identifier 24 is for identifying at least one annotation word and at an interval in the text of the document, said annotation word having two or more annotations associated with two or more context classes. The annotation word identifier identifies the acronyms within the document by examining each word in the document to see if it contains multiple capitalisations. In the event of locating a suitably capitalised word, a further check is conducted on the remains of the sentence (the local context of the word) to see if all words in the sentence are capitalised. If the words are all capitalised, then the word has to be dropped, otherwise the utility is highly likely to end up enriching too many words, many of which are not intended to be acronyms in the sentence.

Just as an acronym can have one or more meanings in different contexts, an Acronym Class has one more annotations associated with Context Classes. Each of Context Class has a series of associated contexts and further keywords, as well as an annotation description of the acronym.

The annotation determiner 26 is for determining the annotation based on the context class with highest value at the annotation word interval. In the preferred embodiment it determines the annotation based on the context class function with the highest value at the annotation word interval.

The annotating engine 28 is for annotating the document with the determined annotation. One option is for a hypertext balloon pop-up of the annotation to be inserted at the acronym. Another option is a hypertext annotation that expands within the document at the acronym.

The acronym database 30 stores the acronyms and annotations. Preferably they are stored with the Context Classes.

The context class database 32 stores the Context Classes.

The annotated document cache 34 stores the annotated documents.

Method

Figure 2:
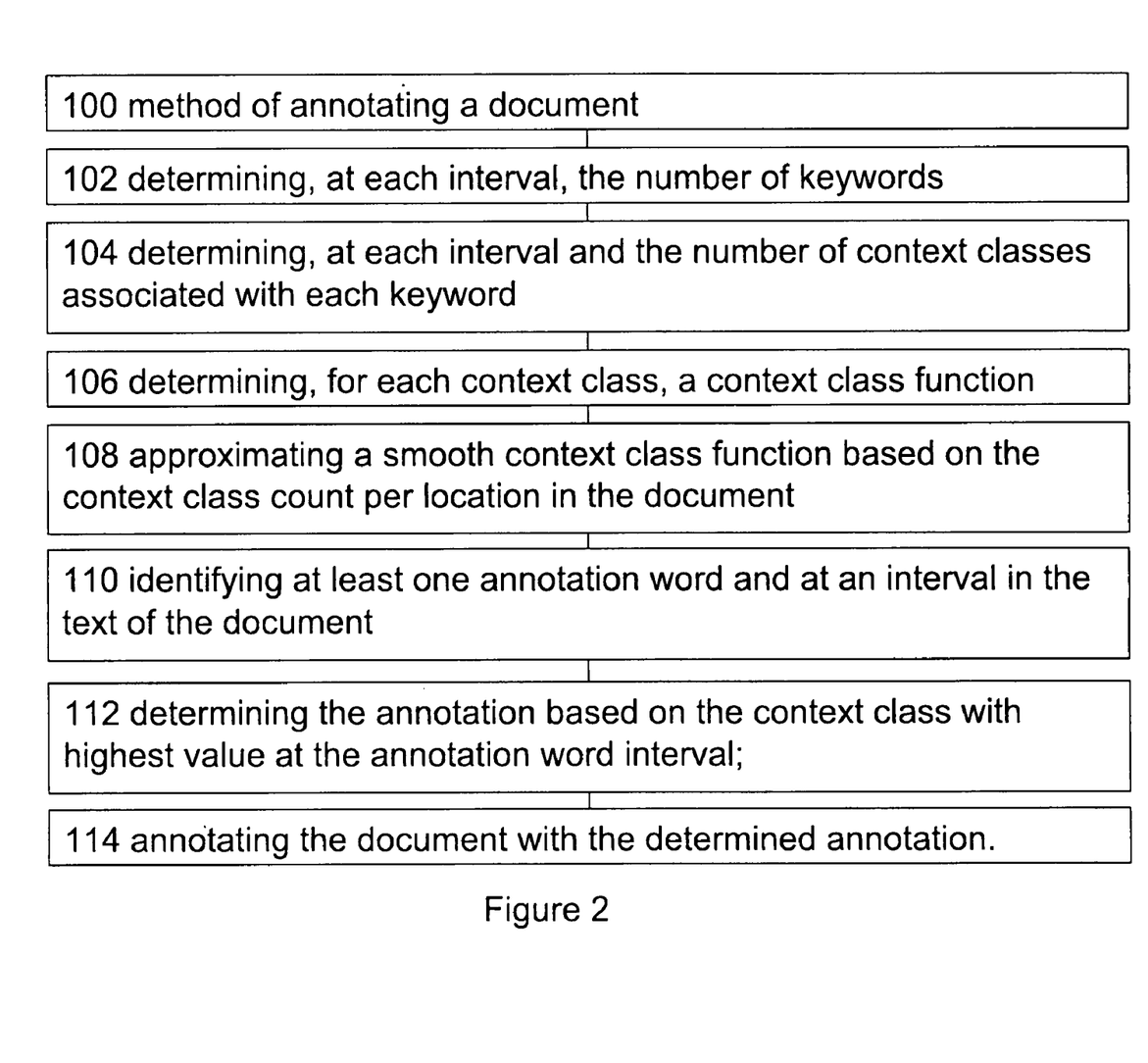
FIG. 2 is a flow chart of the method of the preferred embodiment.

Referring to FIG. 2, a method (100) of the preferred embodiment of annotating a document is described wherein said document is divided by intervals of a sentence.

Step 102, identifying, at each interval in the document, one or more keywords in the text of the document.

Step 104, determining, at each interval, the number of context classes associated with each keyword. Only a subset of the most frequently occurring context classes are counted at each interval. In this context class determining step, a hierarchical context class dictionary comprising context classes and contexts sub-classes is used. The most frequently occurring context class is identified by taking into consideration context classes and context sub-classes.

Step 106, determining, for each context class, a context class function based on the context class count at each interval in the document.

Step 108, approximating a smooth context class function based on the context class count per location in the document.

Step 110, identifying at least one annotation word and at an interval in the text of the document, said annotation word having two or more annotations associated with two or more context classes.

Step 112, determining the annotation based on the context class with highest value at the annotation word interval (or determining the annotation based on the context class function with the highest value at the annotation word interval).

Step 114, annotating the document with the determined annotation.

EXAMPLE

Figure 3:
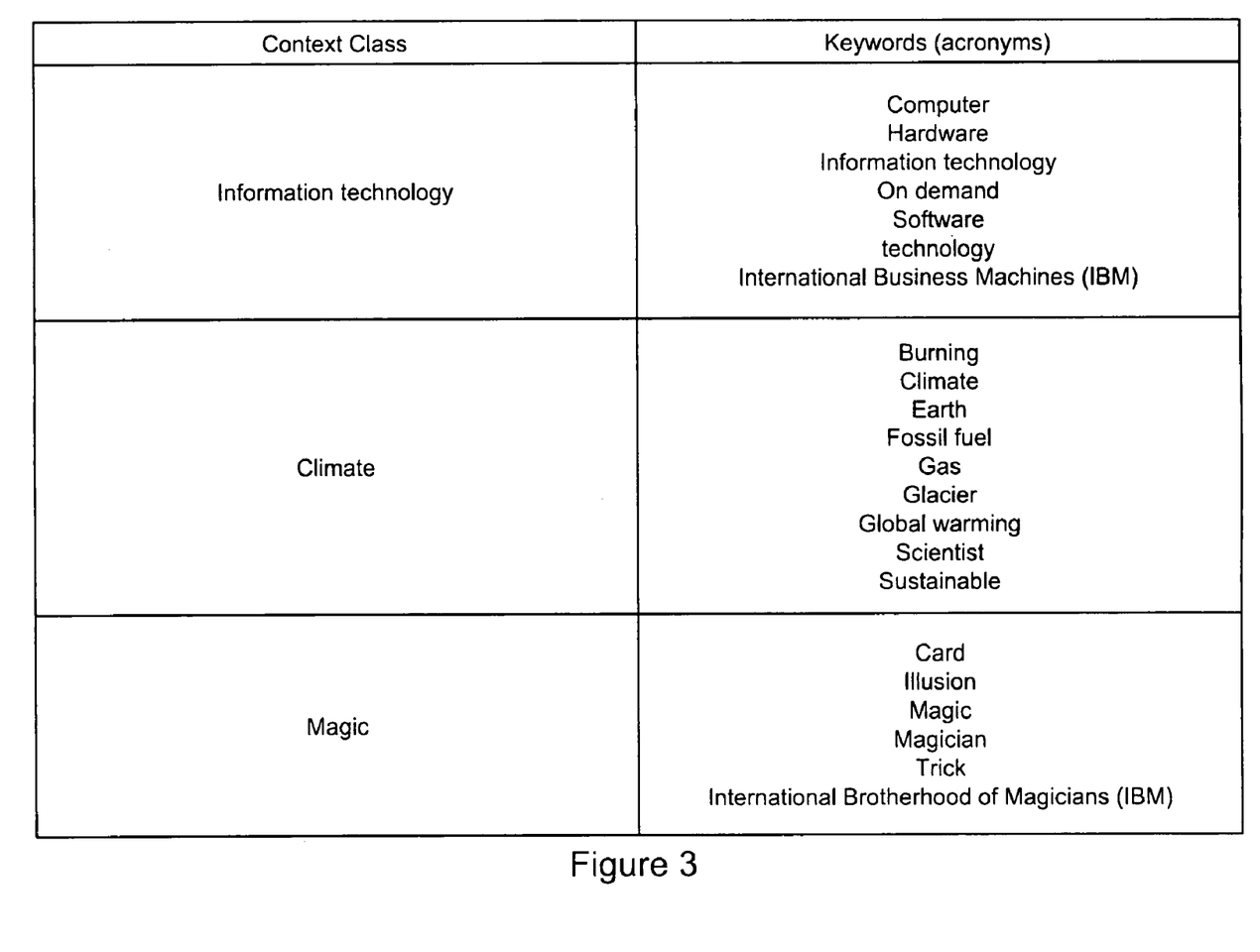
FIG. 3 shows an example table of Context Class data with associated keywords and acronyms.
Figure 4:
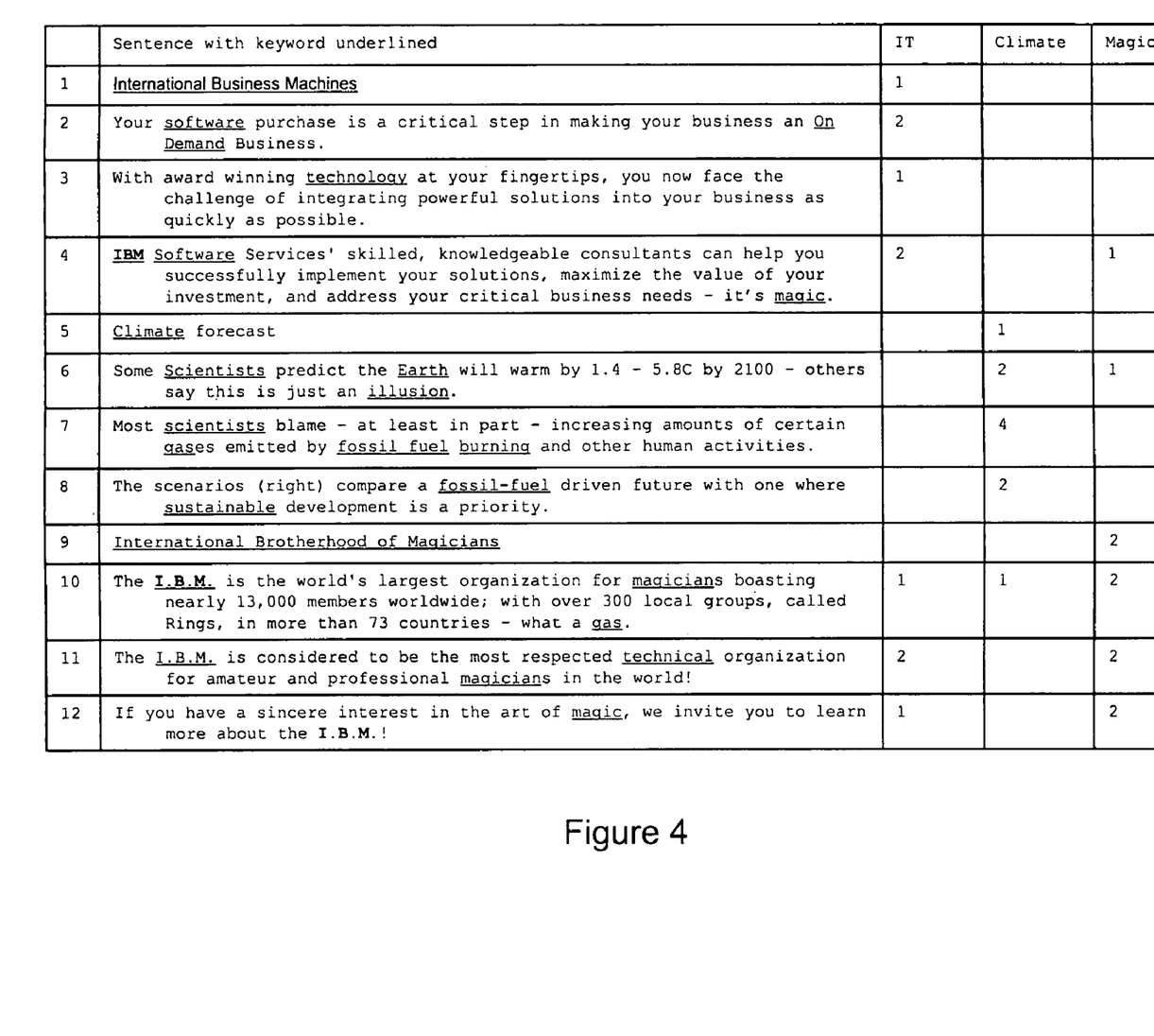
FIG. 4 shows analysis performed on a document according to the example of context data of FIG. 3.
Figure 5:
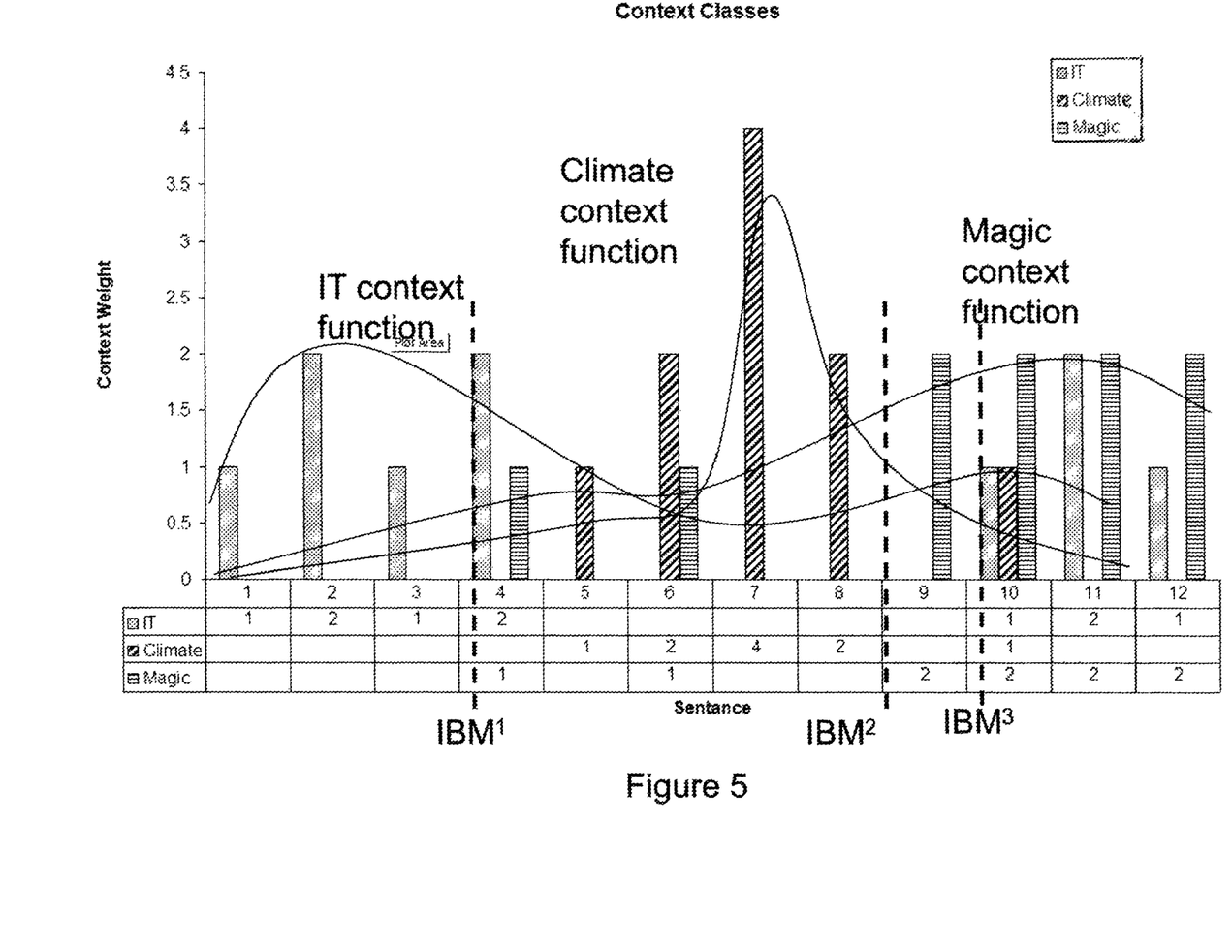
FIG. 5 is a bar chart of analysis of FIG. 4.
Figure 6:
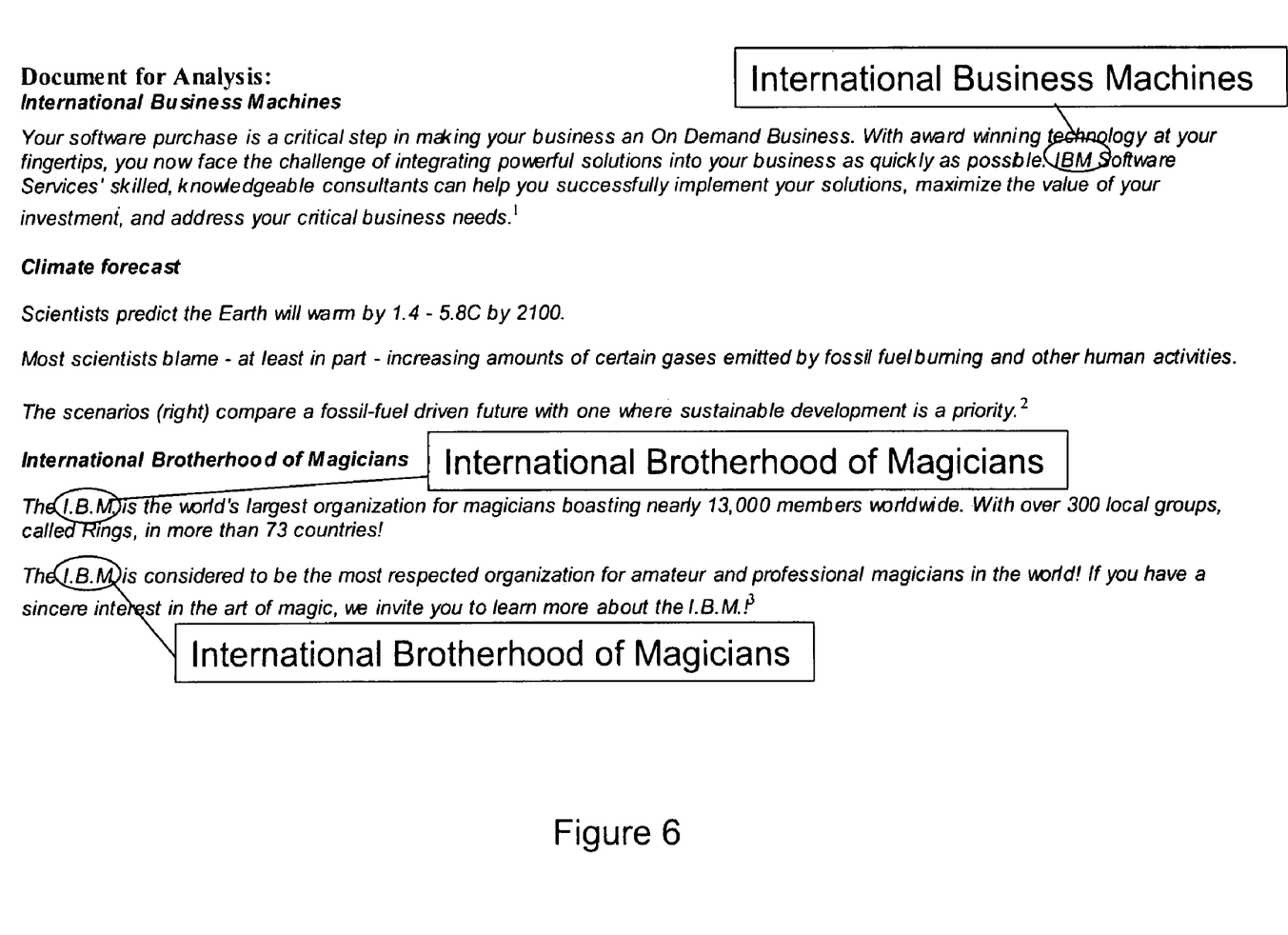
FIG. 6 is a marked up document of the worked example.

A worked example is now described with respect to FIGS. 3, 4, 5 and 6. FIG. 3 shows a table of Context Class data with associated keywords and acronyms. FIG. 4 shows analysis performed on a document including sentence number; document sentences with the keywords, acronyms and annotations underlined, the acronyms are also shown in bold. FIG. 5 is a bar chart of the context class keyword frequency and smooth function approximations. The worked example of FIGS. 3, 4 and 5 is explained with reference to method 100. FIG. 6 is a marked up document of the worked example.

Step 102, identifying, at each interval in the document, one or more keywords. Referring to FIG. 3 all the keywords in the Context Classes (FIG. 3 column 2) are underlined in the text of the document (FIG. 4 column 2).

Step 104, determining, at each interval, the number of context classes associated with each keyword. Column 3, 4 and 5 in FIG. 4 shows the IT, Climate and Magic Context Classes and the count of keywords.

Step 106, determining, for each Context Class, a context class function based on the context class count at each interval in the document. FIG. 5 shows the respective Context Class keyword frequencies plotted as a bar chart. The frequency values are shown on the bar chart.

Step 108, approximating a smooth context class function based on the context class count per location in the document. FIG. 5 shows the respective Context Class function plotted, in the example the approximation are performed by hand but in the embodiment a smoothing algorithm is used.

Step 110, identifying at least one annotation word and at an interval in the text of the document, said annotation word having two or more annotations associated with two or more context classes. Referring to FIG. 3 all the acronyms in the Context Classes (FIG. 3 column 2) are made bold in the text of the document (FIG. 4 column 2).

Step 112, determining the annotation based on the context class with highest value around the annotation word interval (or determining the annotation based on the context class function with the highest value at the annotation word interval). IBM[1] is shown as a dotted line at sentence position 4, in this position the highest context weight around this position is the IT context class with keywords in position 3 and 4 whereas the Magic Context Class only has an accidental occurrence. Therefore IBM[1] is determined as an IT Context Class. IBM[2] is shown as a dotted line at sentence position 8, in this position the highest context weight is either the Climate Context Class or the Magic Context Class. Since the Climate Context Class does not use the IBM acronym then IBM[2] is determined as a Magic Context Class. IBM[3] is shown as a dotted line at sentence position 9, in this position the highest context weight around this position is the Magic. Therefore IBM[3] is determined as an Magic Context Class.

Step 114, annotating the document with the determined annotation. The annotations are shown in FIG. 6. An International Business Machines pop-up is shown connected to IBM in sentence 3. Two International Brotherhood of Magician pop-ups are shown connected to I.B.M. in sentence 8 and 9 respectively.

Extensions

Acronym identification it can be limited to acronyms for nouns which are the most common abbreviations and occur in the position of a noun within the sentence. The acronym can therefore be further validated by applying a grammatical rules checker and then only accepting candidates that are nouns within a sentence.

Optimisations

Some optimisations could be applied to the system.

Server side caching. The results of the processing can be cached server side, storing the context scores for documents that have been previously visited. FIG. 7 shows method steps for optimizing the cache results at the server side.

Early page delivery. The html pages (or other document types) can be delivered to the user before full processing of the document has taken place. Ajax techniques can then be used to update the links within the document to use the system, as they become available. Alternatively a simpler method would simply be to do a full page refresh once the document has been processed.

Out of date cache results. The context scoring is likely to take the most processing time during this system. If a document has been updated, usually the contents of a cache would be dumped. However uniquely in this system the contents of the cache may still initially be used to create a basic context and then used against the new document to present the document back to the user quickly. The possible matches can then be updated later once a full context has been developed for the new page.

Alternative Applications

Semantic web crawler. Websites can be crawled and their content understood. This could provide the basis of the next generation of search engine, where the annotation server not only understands the context of the websites, but also the context of the users search request.

Legibility and context validation of user documents. The annotation server can be used to analyse documents and let users know the category the document is deemed to be in. This information can be used to determine whether the document has been written in such a way to fall into the desired category.

Feedback mechanism—next stage of advertising. During normal use, the annotation server will create contexts of websites the user has visited. Using this information, advertisements can be selected to be shown to the user. Currently the advertisements that are selected are based on words within the document that is being viewed. With the advantage of knowing the context of the website and the users' general contextual area of interest, advertisements can be chosen to better suit the user.

Content validation, compression. Once a document has been written, the annotation server can validate it. The document can be checked to make sure all acronyms have been properly defined. Checks can be so that the full spelling of acronyms is not repeated, then compress the them down to the abbreviation.

File compression—alternate file storage. Using the database of acronyms, the annotation server could be used to compress text documents. Other compression algorithms work by dynamically creating a table of parts of documents that are repeated. Each element is then referenced instead of repeating the contents numerous times. The disadvantage is the table is an over head in itself, the annotation server on the other hand, could represent an external table. Documents could be parsed; long chains of words could be compressed to a fraction of their size and distributed or stored. Upon reading the annotation server can be used to retrieve the true meaning of the document.

Deterministic method of evaluating traffic. An implementation of the annotation server could be deployed not only to annotate users acronyms but to analyse the traffic they are generating. Using the example of a large corporation, the use of the internet by employees is needed to do their job; however browsing the web instead of working is a costly in terms of wasted time. The annotation server could be used to determine the category of each user's traffic, if the category looks as though it is straying for the company's area of work an administrator could be alerted.

Using the scoring algorithm for advanced pattern matching. The essential idea behind THE ANNOTATION SERVER is the matching of patterns and placing in categories. Once a category is found an output is determined. This technique could be extended beyond the realms of text based documents, for example, certain social patterns could be observed and categorised and materials could be scanned to gauge quality.

Other Embodiments

The annotation server sits in between the end user and the internet there are a number of ways it can be implemented, not just in a server proxy as the preferred embodiment.

Browser dependant annotation server plug-in. The plug-in allows the user to easily route data through the annotation server or straight to the internet.

Transparent proxy. The annotation server can be applied with out any user setup.

Presentation layer. A presentation layer enables the annotation server to be applied to any browser by detecting HTTP request at the presentation layer and rerouting them to the annotation server.

Gateway. Detect HTTP requests at the gateway or router and redirect to annotation server.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid. The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software. When using the site-to-site VPN, the process software is deployed, accessed and executed through the use of dedicated equipment and large-scale encryption that are used to connect a companies multiple fixed sites over a public network such as the Internet. The process software is transported over the VPN via tunneling which is the process the of placing an entire packet within another packet and sending it over a network. The protocol of the outer packet is understood by the network and both points, called tunnel interfaces, where the packet enters and exits the network.

The invention claimed is:

1. A computer-implemented method of annotating a document, said document being divided by intervals, said method comprising:
    determining context classes for the documents;
    identifying, at each interval in the document, one or more keywords in the text of the document;
    determining, at each interval, the number of key words associated with each context class;
    identifying at least one annotation word at an interval in the text of the document, said annotation word having two or more annotations associated with two or more context classes;
    determining the annotation based on the context class having highest number of key words associated therewith at the annotation word interval; and
    annotating the annotation word with the determined annotation.

2. The method according to claim 1 wherein only a subset of the most frequently occurring context classes are counted at each interval.

3. The method according to claim 1 further comprising:
    determining, for each context class, a context class function based on the count of key words associated with the context class at each interval in the document;
    approximating to obtain a smooth context class function; and
    determining an annotation based on the context class function with the highest value at the annotation word interval.

4. The method according to claim 1 wherein the annotation word is an abbreviation or acronym, and a sentence is the interval used in a document.

5. The method according to claim 1 wherein the context class determining step uses a hierarchical context class dictionary comprising context classes and context sub-classes and identifying the most frequently occurring context class by taking into consideration the context class and context sub-class.

6. A computer system of annotating a document, said document being divided by intervals, said system comprising:
    processor configured to
        determine context classes for the documents;
        identify, at each interval in the document, one or more keywords in the text of the document;
        determine, at each interval, the number of key words associated with each context class;
        identify at least one annotation word at an interval in the text of the document, said annotation word having two or more annotations associated with two or more context classes;
        determine the annotation based on the context class having highest number of key words associated therewith at the annotation word interval; and
        annotate the annotation word with the determined annotation.

7. The system according to claim 6 wherein only a subset of the most frequently occurring context classes are counted at each interval.

8. The system according to claim 6 wherein the processor is further configured to determine, for each context class, a context class function based on the count of key words associated with the context class at each interval in the document; approximate to obtain a smooth context class function; and determine an annotation based on the context class function with the highest value at the annotation word interval.

9. The system according to claim 6 wherein a sentence is the interval used in a document.

10. The system according to claim 6 wherein the processor is configured to determine context classes using a hierarchical context class dictionary comprising context classes and context sub-classes and identifying the most frequently occurring context class by taking into consideration the context class and context sub-class.

11. A computer program product comprising computer readable storage medium excluding signals storing computer readable code for annotating a document, said computer readable code which when loaded onto a computer system and executed performs the following steps:

determining context classes for the documents;

identifying, at each interval in the document, one or more keywords in the text of the document;

determining, at each interval, the number of key words associated with each context class;

identifying at least one annotation word at an interval in the text of the document, said annotation word having two or more annotations associated with two or more context classes;

determining the annotation based on the context class having highest number of key words associated therewith at the annotation word interval; and     annotating the annotation word with the determined annotation.

12. The computer program product according to claim 11 wherein only a subset of the most frequently occurring context classes are counted at each interval.

13. The computer program product according to claim 11 further comprising:

determining, for each context class, a context class function based on the count of key words associated with the context class at each interval in the document;

approximating to obtain a smooth context class function; and     determining an annotation based on the context class function with the highest value at the annotation word interval.

14. The computer program product according to claim 11 wherein a sentence is the interval used in a document.

15. The computer program product according to claim 11 wherein the context class determining step uses a hierarchical context class dictionary comprising context classes and context sub-classes and identifying the most frequently occurring context class by taking into consideration the context class and context sub-class.

\* \* \* \* \*